Fig. 1a.

_United States Patent Office_ 2,996,293
Patented Aug. 15, 1961

2,996,293
FURNACES FOR ANNEALING AND HEAT TREATMENT OF METALS AND OTHER MATERIALS
John Fallon, 82 St. Bernards Road, Olton,
Birmingham, England
Filed Aug. 27, 1958, Ser. No. 757,572
3 Claims. (Cl. 266—4)

The present invention has relation to furnaces for annealing and heat treatment of metals and other materials, and has for its object primarily to increase the throughput of such furnaces according to the nature of the load whilst presenting a particularly efficient method of heat transfer to the load step by step throughout the preheating, heating and cooling phases of the thermal cycle and to meet the variations in heat demand, combining variation in direction of flow of heating gases to suit particular requirements.

According to the present invention there is provided a furnace for annealing and heat treatment of metals and other materials comprising two conveyor tracks in parallel, each track having a charging chamber preheating chamber and heating chamber, said furnace being characterised in that two heating chambers are connected laterally in series for the flow of heating gases. Similarly, cooling chambers may be connected laterally in series for the flow of cooling gases. The laterally connected heat treatment chambers or furnace may be of an upright substantially rectangular character, blowers being used for the appropriate circulation of the gases and each conveyor may pass centrally through the upright compartment constituted by the rectangle, above and/or below which suitable heating elements may be incorporated. Similarly the cooling chamber or chambers may be of upright rectangular formation, each conveyor passing centrally through the upright compartments constituted by the rectangle above and/or below which cooling elements may be incorporated, a blower or fan being used for circulation purposes.

In order that the invention may be clearly understood and readily carried into practice reference may be had to the appended explanatory drawings in which.

Figure 1A:
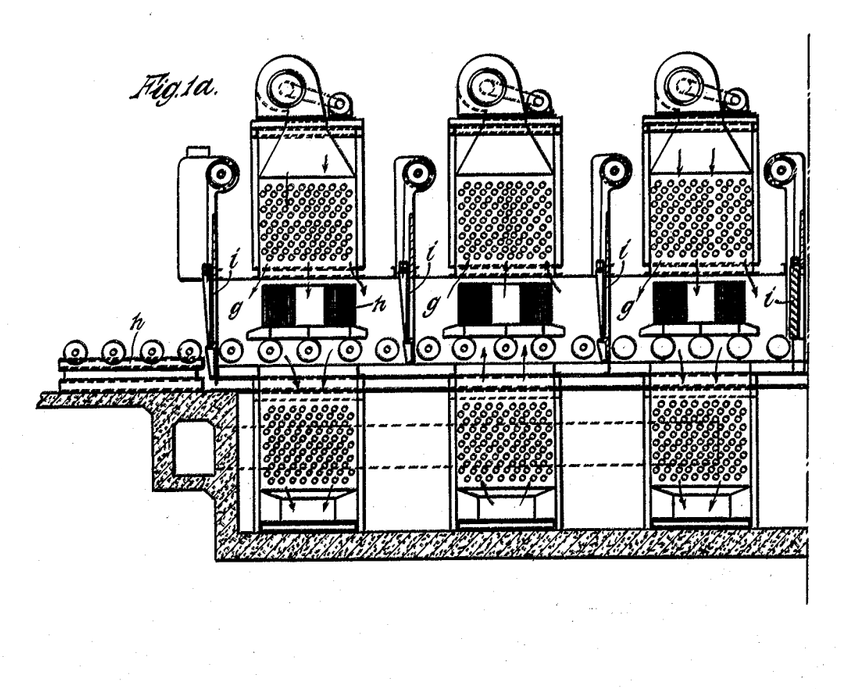
FIGURES 1a, 1b and 1c when placed together illustrate in vertical sectional elevation the furnace for heat treatment of metals and other materials in accordance with the present invention and similarly FIGURES 2a, 2b and 2c when placed together illustrate the furnace in horizontal sectional plan.
Figure 1B:
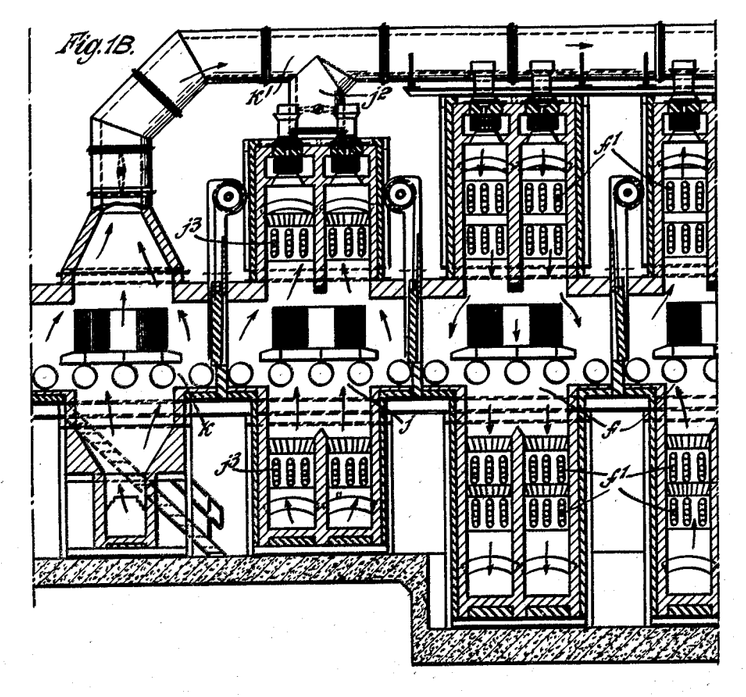
Figure 1C:
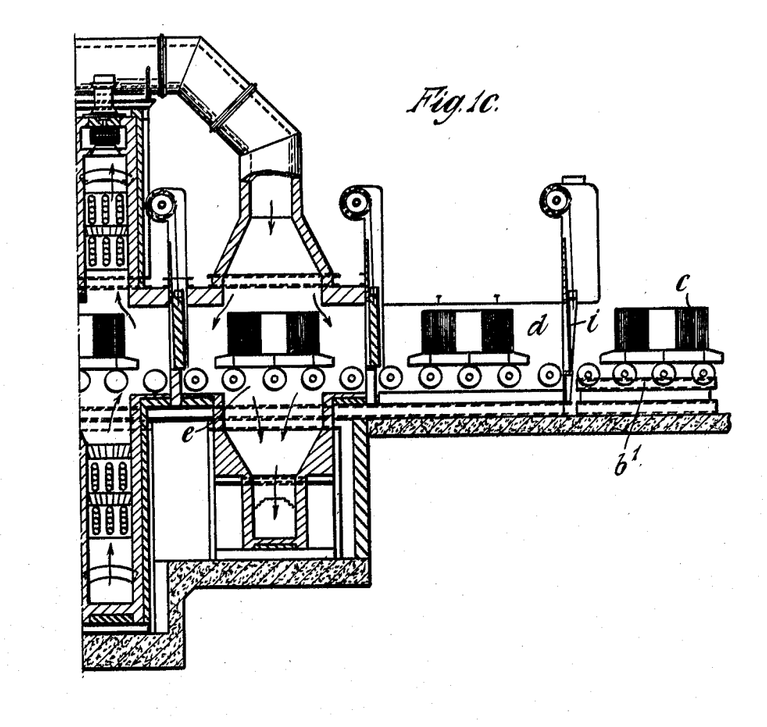
Figure 2A:
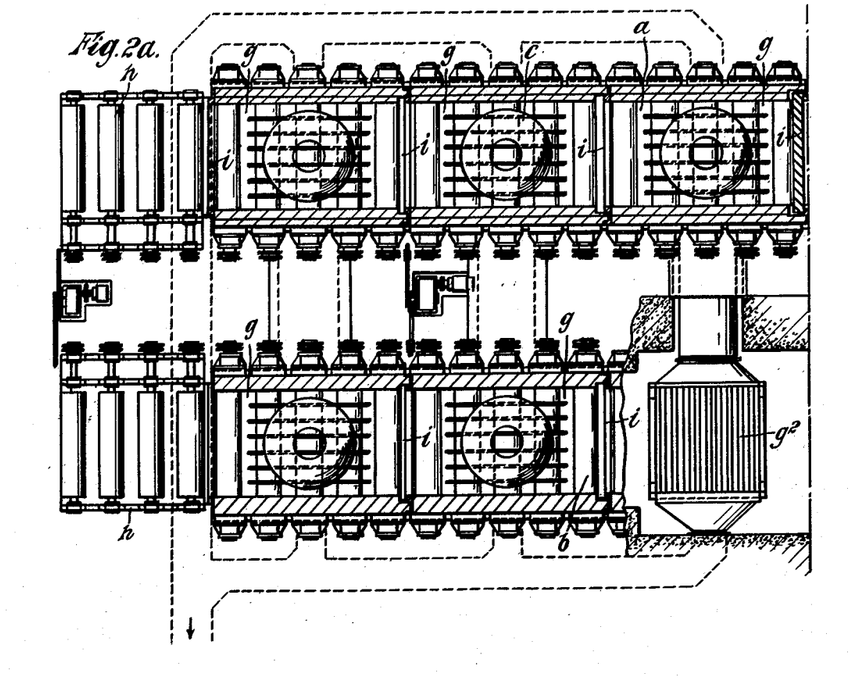
Figure 2B:
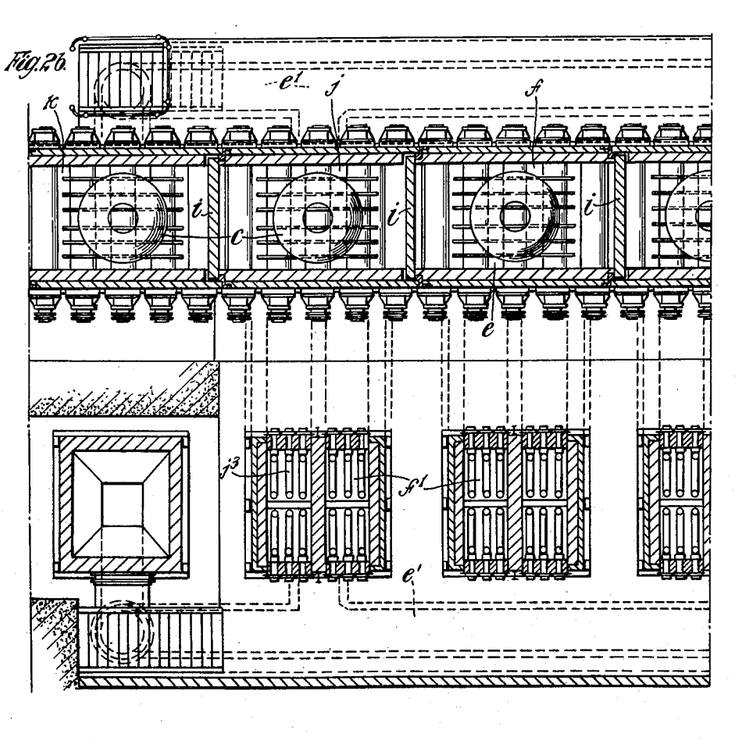
Figure 2C:
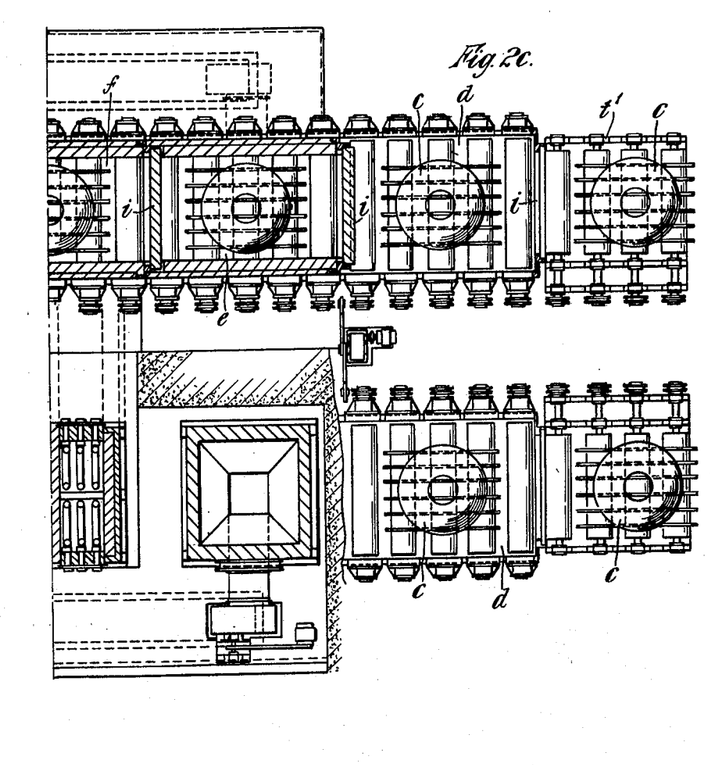

In a convenient embodiment of the present invention the furnace comprises two side by side or parallel conveyor tracks of the roller, mattress, walking beam or other conventional type. Roller tracks ($a$ and $b$ FIGURES 2a, 2b and 2c) are illustrated and described for convenience. The goods to be treated are mounted on rollers $b^1$ without the furnace whence they enter into a charging or purging chamber $d$ then into a preheating chamber $e$ following which the said goods enter the heating chamber $f$ and then progressively pass to the cooling chambers $g$ through a discharge door to the open $h$. Sliding doors $i$ are provided between the various chambers in known manner. The present invention is primarily concerned wtih the heating chambers $f$ and cooling chambers $g$, and in this invention the heating chambers $f$ are of rectangular or equivalent formation involving a continuous passage of rectangular or equivalent shape, see FIGURE 3, disposed transversely of and uniting the two conveyors $a$ and $b$ and looping them together, and the one conveyor track $a$ passes through one vertical chamber and the other conveyor track $b$ passes through the opposite and other vertical chamber. Above and below each roller track are suitable heating elements $f^1$ and in the upper part of the furnace are provided one, two or more blowers or circulating fans $f^2$ which cause the gases to circulate to requirements.

Figure 3:
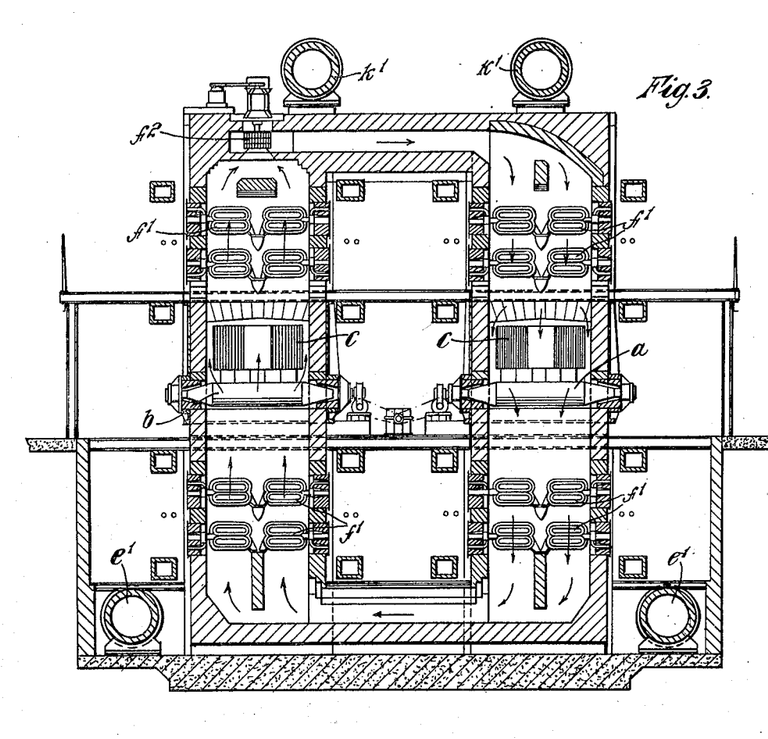
FIGURE 3 is a vertical sectional elevation taken through one of the heat furnaces.
Figure 4:
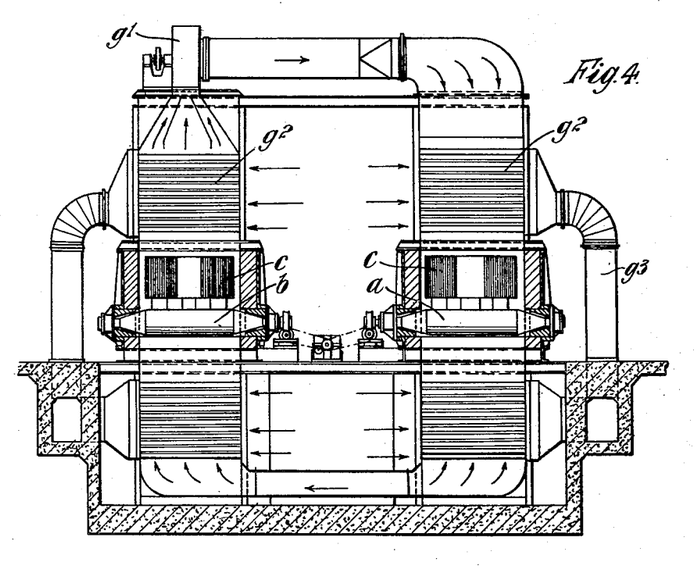
FIGURE 4 is a vertical sectional elevation taken through one of the cooling chambers and FIGURE 5 is a vertical sectional elevation taken through the preheating chamber.
Figure 5:
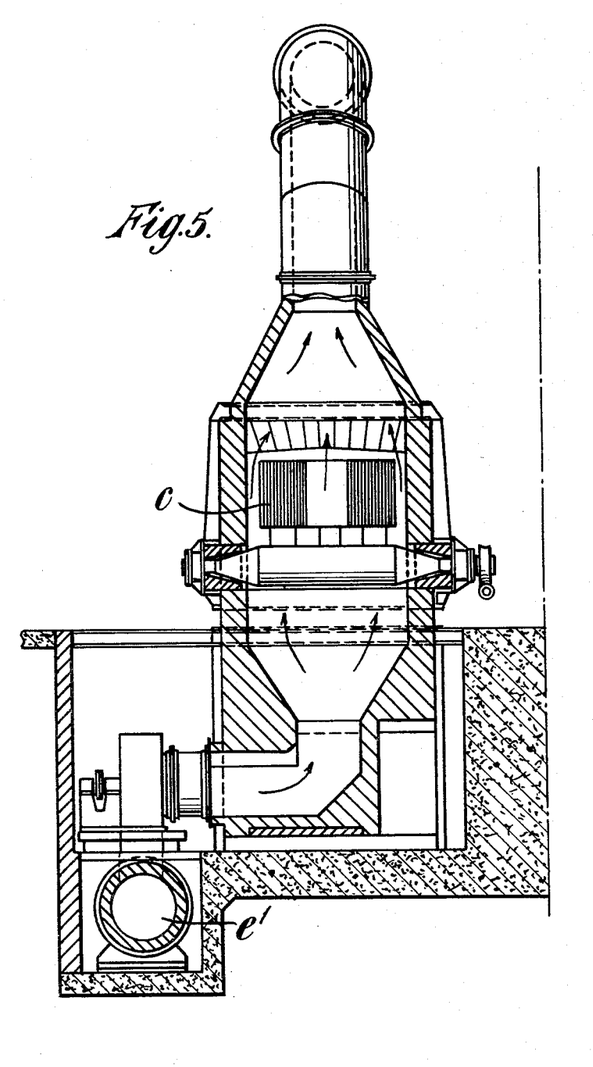

The direction of flow of the heating gases in the heating chamber $f$ is or may be changed or reversed from chamber to chamber. Thus for instance in the first heating chamber the flow observed from the charging end may be clockwise through the transverse connecting flues and in the next heating chamber it may be counter-clockwise, see arrows in adjacent chambers $f$, thus ensuring by reversing the direction of flow from stage to stage absolute uniformity of heat delivery or heat transfer. Similarly in adjacent cooling chambers $g$ the flow of atmosphere may be reversed as indicated by the arrows.

$j$ illustrates the soaking chamber and $k$ the first cooling chamber. The soaking chamber $j$ is provided with blowers $j^1$ for circulation purposes and the cooling chamber $k$ is connected by a conduit $k^1$ to the upper part of the preheating chamber $e$. Similarly the lower part of the chamber $e$ is connected by conduit $e^1$ to a lower part of the first cooling chamber $k$. Similarly the soaking chamber $j$ is connected by $j^2$ to the conduit $k^1$ so that the heat in this soaking section $j$ and cooling section $k$ may be transferred to the load in the preheating chamber $e$ by rapid circulation of gases selectively from either of these two chambers. In the soaking chamber $j$ the heating elements $j^3$ may be smaller in number than the heating elements $f^1$ in the heating chambers as in the soaking operation this is intended merely to hold heat as required but in cases where no soaking is necessary, this chamber $j$ can be used for cooling purposes. In any event the heat of the load can be transferred from chambers $j$ and/or $k$ to preheat chamber $e$ through the insulated ducts $k^1$ outgoing and $e^1$ return.

With reference to the FIGURE 3, it is to be noted that the parallel conveyors $a$ and $b$ pass centrally through what may be termed a rectangular or looped shaped circuitous chamber and the arrows indicate the flow of gases promoted by the circulating fans $f^2$.

With reference to the FIGURE 4 this illustrates in vertical sectional elevation a cooling chamber. Here again conveyors $a$ and $b$ pass through a rectangular looplike structure, appropriate gas or protective atmosphere is circulated by means of a fan $g^1$ in accordance with the arrows and air or other suitable coolant is introduced into the tubes $g^2$ by virtue of suction tubes $g^3$.

It is again to be noted that gases in the adjacent sections of the two chambers $f$ advantageously flow in opposite directions and the same applies to the flow of gas or protective atmosphere in adjacent cooling chambers.

The present invention therefore is characterized by parallel conveyor tracks incorporating charging, preheating, heating, cooling and discharging chambers which parallel tracks have heating chambers and cooling chambers connected therewith laterally in series and in endless circulatory manner and it will be appreciated that by this construction many facilities are provided for the expeditious heating and cooling of the material being treated and passing through the apparatus stage by stage.

By the provision of a series of transverse gaseous circuit circulating through the adjacent chambers of parallel disposed tracks, there is assured rapid and equal rates of heating or cooling of the work load similarly disposed in each furnace and the requisite heating or cooling of the transverse flow gases is obtained by adequate disposal of heating or cooling elements arranged above and below the work load and its appropriate conveyor. The direction of gaseous flow within these transfer conduits may also be changed or reversed from clockwise to anti-clockwise and vice versa at timed intervals according to the requirements and nature of the work to be charged either in the preheating, heating or cooling phases of the required thermal cycle to which the load is subjected, by the alternate operation by suitable sequence control of one or other of two blowers of opposite flow characteristics within any one or all of the transverse circulation conduits.

In effect each chamber or division, whether preheating, heating or cooling, is provided with an upper and lower heat exchanger for heating or cooling, recirculating gases providing high velocity convection currents, and each heat exchanger is cross-connected to a corresponding heat exchanger operating in conjunction with an identical compartment in an adjacent parallel furnace. Thus the two parallel furnaces operate automatically and in synchronism with each other through suitable timing gear. The transverse gaseous connecting conduits together with their respective heat exchangers are identical and by this means equal rates of heating and cooling or heat transfer to and from the work charge is ensured.

The following programme or conveying cycle may be established for the two parallel furnaces and carried by suitable time sequence control mechanism. On the assumption that all compartments are loaded with work charges the cycle is as follows:

(1) The discharge door is opened and the work load in the discharge section is discharged.

(2) The discharge door is then closed. All doors or partitions between the charging door and the discharge door (but not including the charging door) are open.

(3) The conveyor then advances the load in each chamber to the succeeding chamber in the direction of and towards the discharge door.

(4) All intermediate doors are then closed.

(5) The charging chamber is then empty.

(6) The charging door is then opened and a new work load is charged into it. The charging door is then closed, and so the operations are repeated when the work load is heated and soaked, at the required temperature.

These operations are carried out simultaneously on each unit of this duplex system. The transverse gaseous circulating, heating and cooling systems are maintained continuously throughout and without interruption during the foregoing load transfer operations. Thus by a step continuous method of load transfer from compartment to compartment, from charging, purging, preheating, heating, cooling and discharge, by corresponding synchronous transfer in each of these parallel units together forming this duplex system in combination with the transverse gaseous circulation through adjacent isolated chambers in the respective furnaces, the highest possible rate of heat transfer is obtained at each stage of preheating, heating and cooling at rates hitherto impossible of attainment in any tandem straight line continuous furnace.

By the method and construction described in the foregoing, furnace output or throughput may be increased according to the nature of the load, in some cases to several times that obtainable in conventional straight line continuous furnaces.

An alternative use of the present system may be contemplated whereby two parallel units are operated contraflow so that in this case, suppose there is a central heating chamber on each one, by operating contraflow the work load is discharged into the next chamber towards its discharge door, whereas in the adjacent furnace a cool charge is in the adjacent chamber so that in this case on each side of the heated chamber there would be an equalising chamber or transverse conduit in which one hot charge advancing towards the discharge door is disposed and one cool charge advancing towards the heated section is disposed, thus by circulatory methods heat from the hot charge is transferred to the cool work load advancing towards the hot chamber. This could effect economies with heavy loads in transferring heat from the cooling load into the work being preheated, thus averaging the temperature of the cool load advancing to the hot chamber with the hot load advancing towards the cooling chamber.

The system can be applied equally well for heating loads which have to be hot-discharged, for instance, forging and other shaped pieces of metal or material sometimes have to be discharged hot and quenched, in which case cooling chambers may be eliminated. The system may be worked quite effectively up to the end of the heating stage $f$ for this class of work.

I claim:

1. A furnace for annealing and heat treatment of metals and other materials comprising, in combination, two substantially parallel conveyor tracks, successive preheating, heating and cooling chambers for each of the tracks, two heating chambers being connected laterally in series to form a closed loop for the circulation of heating gases, two cooling chambers being connected laterally in series to form a closed loop for the circulation of cooling gases, selectively operable means for isolating each of the chambers from every other chamber along its respective track, and conduit means leading from at least one of the cooling chambers to a preheating chamber and from such preheating chamber back to such cooling chamber.

2. A furnace for annealing and heat treatment of metals and other materials comprising, in combination, two conveyor tracks, preheating, heating and cooling chambers for each of the tracks, two heating chambers connected laterally in series and two cooling chambers connected laterally in series for the respective circulation of gases, the laterally connected chambers each having an upright substantially rectangular shape in transverse cross section, each of the conveyor tracks passing centrally through an upright heating chamber and an upright cooling chamber, and conduit means leading from at least one of the cooling chambers to a preheating chamber.

3. A furnace for annealing and heat treatment of metals and other materials comprising, in combination, two conveyor tracks, preheating, heating and cooling chambers for each of the tracks, two heating chambers connected laterally in series and two cooling chambers connected laterally in series for the respective circulation of gases, the laterally connected chambers each having an upright substantially rectangular shape in transverse cross section, each of the conveyor tracks passing centrally through an upright heating chamber and an upright cooling chamber, door means for separating each of the chambers from every other chamber along its respective track, and conduit means leading from at least one of the cooling chambers to a preheating chamber.

References Cited in the file of this patent

UNITED STATES PATENTS

| | | |
|---|---|---|
| 1,808,152 | Baily | June 2, 1931 |
| 1,924,167 | Smalley | Aug. 29, 1933 |
| 1,979,108 | Ipsen | Oct. 30, 1934 |
| 2,223,603 | Darrah | Dec. 3, 1940 |
| 2,234,871 | MacDonald | Mar. 11, 1941 |

OTHER REFERENCES

Germany, B31215 VI/18c, May 29, 1954, published Feb. 2, 1956.